D. L. EVANS AND F. A. PHILLIPPI.
COOLER.
APPLICATION FILED NOV. 3, 1917.
1,313,624.
Patented Aug. 19, 1919.
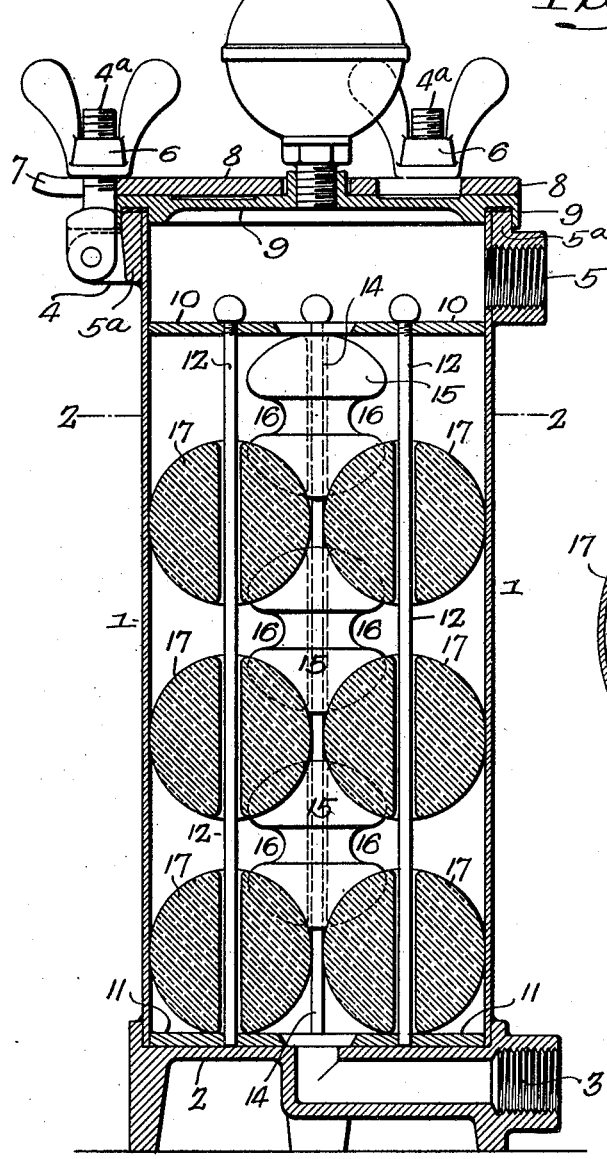
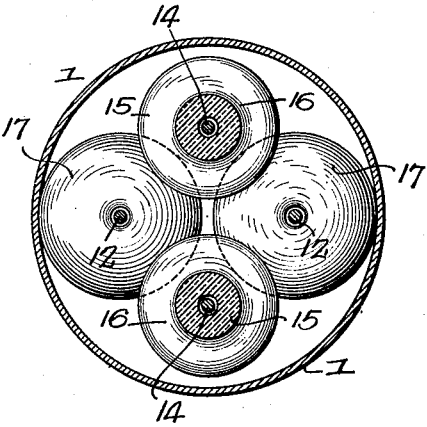
Inventors.—
Daniel L. Evans,
Frank A. Phillippi.
by their Attorneys.—
Howson & Howson

UNITED STATES PATENT OFFICE.

DANIEL L. EVANS AND FRANK A. PHILLIPPI, OF POTTSTOWN, PENNSYLVANIA, ASSIGNORS TO SANITARY MANUFACTURING CORPORATION, OF WILMINGTON, DELAWARE, A CORPORATION OF DELAWARE.

COOLER.

1,313,624.        Specification of Letters Patent.        Patented Aug. 19, 1919.

Application filed November 3, 1917. Serial No. 200,096.

*To all whom it may concern:*

Be it known that we, DANIEL L. EVANS and FRANK A. PHILLIPPI, citizens of the United States, residing in Pottstown, Montgomery county, State of Pennsylvania, have invented Coolers, of which the following is a specification.

One object of our invention is to provide a compact, substantial and relatively efficient device for cooling such liquids as water, beer, etc., which shall be inexpensive to manufacture, simple in construction and easily cleaned, and whose interior parts are so mounted as to permit of their quick and convenient removal and replacement.

These objects and other advantageous ends we secure as hereinafter set forth, reference being had to the accompanying drawings, in which:—

Figure 1 is a vertical section of a cooler constructed according to our invention; and Fig. 2 is a transverse section on the line 2—2, Fig. 1.

In the above drawings, 1 represents a more or less elongated, substantially cylindrical casing preferably though not necessarily made of some non-corrosive metal such as tin, tinned brass, etc., and having a base 2 to which it is secured. This base is formed with an integral or other suitably connected conduit 3 forming an outlet in the case illustrated and opening into the interior of the casing at the center of said base. The upper end of the casing is provided with a collar 5ᵃ preferably sweated or soldered in place and provided at one side with a tubular boss 5 constituting an inlet.

From this collar 5ᵃ project lugs 4 to which are pivoted threaded bolts 4ᵃ for the reception of thumb nuts 6 designed to engage forked lugs 7 projecting from a clamping plate 8 designed to hold a cover plate 9 against the open end of the casing, there being preferably a gasket of suitable material between the end of the latter and said cover plate.

Within the casing we mount a frame consisting of top and bottom plates 10 and 11 connected by four or any other suitable number of sets of guide rods 12 and 14 which are sweated to said bottom plate and at their upper ends passed through the top plate which is removably held in place at a level slightly below the inlet 5. Said latter plate closely fits the interior of the casing and has a centrally placed opening for the delivery of liquid into the main portion of the casing. The plate 10 is maintained on the rods 12 and 14 by spherical thumb nuts threaded thereon.

The two rods 14 engage opposite points of the two removable plates 10 and 11 at equal distances from the center thereof which preferably lies in the central line of the casing and on them are mounted a series of substantially spherical baffle structures 15 of porcelain, glass, cement, non-corrosive metal, earthen ware, etc., which while shown as having annular grooves 16 may be made wholly spherical as in the case of a similar series of balls or spheres 17 mounted on the rods 12. While the dimensions of the baffle structures 15 and 17 may be widely varied, we preferably make them of a diameter somewhat less than the radius of the casing and so mount the rods 12 and 14 that the distance between opposite rods is somewhat greater than said radius. Moreover the baffle structures 15 and 17 are staggered or alternated and with the arrangement shown are practically tangent to the inside surface of the casing.

With the described arrangement of parts, when the cover and clamping plate are secured in position, liquid admitted to the inlet 5 is delivered to the center of the top of the casing whence it is caused to follow a tortuous path in flowing down and around the various baffle structures and tends to form eddies around them as well as in the annular grooves of the structures 15 so that its passage is delayed sufficiently to permit it to be cooled to a relatively low temperature, it being understood that under conditions of use the casing is placed in a vessel containing ice or other refrigerating means.

When it is desired to clean or inspect the condition of the cooler, the cover plates may be easily removed by backing off the thumb nuts and swinging the hinged bolts away from the frame, after which the rods 12 and 14 with their plates and baffle structures may be easily removed from the casing. Since said baffle structures are made with grooved surfaces and round edges they do not tend to collect solid material and when desired may be perfectly cleaned with the greatest ease especially since they may be rotated upon the rods 12 and 14 in order to expose their inner portions.

Obviously without departing from our invention the shape of the baffle structures may be considerably modified and if desired they may be all of a spherical form or all provided with annular grooves 16. In any case they are preferably arranged in alternate sets from one end to the other of the casing and are carried on a frame whereby they may be simultaneously removed from said casing. In some cases however, without departing from our invention, the spherical baffles may be placed in the casing in the manner shown without the retaining frame, although this latter is preferred.

We claim:—

1. A cooler consisting of a casing having an inlet and an outlet; with a series of substantially spherical baffle structures in the casing; and a frame engaging said structures for simultaneously removing the same.

2. The combination in a cooler of a casing; a plurality of guide rods mounted in said casing; and series of overlapping baffle structures rotatably mounted on said rods.

3. The combination in a cooler of a casing; a plurality of guide rods extending longitudinally of said casing; and substantially spherical baffle structures rotatably mounted on said rods.

4. The combination in a cooler of an elongated substantially cylindrical casing having a removable cover and provided with an inlet and outlet at relatively distant points; a removable frame in the casing including guide rods extending longitudinally thereof; with a series of spherical structures of vitreous material rotatably mounted on said rods in relatively staggered sets and substantially tangent to the inner surface of the casing.

5. The combination of a casing having an inlet and outlet; with a series of substantially spherical baffle bodies having annular grooves and mounted in the casing in position to provide tortuous channels between the inlet and outlet with a structure for definitely positioning said bodies in said casing.

6. The combination in a cooler of an elongated casing having an inlet and an outlet at relatively distant points; a plurality of rods extending longitudinally of said casing; series of overlapping baffle structures respectively mounted on said rods; with a plate having a central opening and interposed between one of the openings of the casing and said baffle structures.

In witness whereof we affix our signatures.

DANIEL L. EVANS.
FRANK A. PHILLIPPI.

Copies of this patent may be obtained for five cents each, by addressing the "Commissioner of Patents, Washington, D. C."